(12) United States Patent  
Huang

(10) Patent No.: US 8,173,581 B2  
(45) Date of Patent: May 8, 2012

(54) MUTUAL SOLVENT-SOLUBLE AND/OR ALCOHOL BLENDS-SOLUBLE PARTICLES FOR VISCOELASTIC SURFACTANT FLUIDS

(75) Inventor: Tianping Huang, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 361 days.

(21) Appl. No.: 12/122,871

(22) Filed: May 19, 2008

(65) Prior Publication Data

US 2009/0286703 A1 Nov. 19, 2009

(51) Int. Cl.  
*C09K 8/74* (2006.01)

(52) U.S. Cl. ........ 507/260; 507/240; 507/245; 507/261; 507/263; 507/265; 507/266; 507/267; 166/305.1

(58) Field of Classification Search .................. None  
See application file for complete search history.

(56) References Cited

U.S. PATENT DOCUMENTS

| | | | |
|---|---|---|---|
| 6,805,198 B2 * | 10/2004 | Huang et al. | 166/307 |
| 6,994,166 B2 * | 2/2006 | Huang et al. | 166/282 |
| 7,219,731 B2 | 5/2007 | Sullivan et al. | |
| 7,220,709 B1 | 5/2007 | Qu et al. | |
| 7,527,102 B2 * | 5/2009 | Crews et al. | 166/307 |
| 2003/0111225 A1 | 6/2003 | Huang et al. | |
| 2003/0119680 A1 * | 6/2003 | Chang et al. | 507/200 |
| 2007/0151726 A1 | 7/2007 | Crews et al. | |
| 2008/0060812 A1 | 3/2008 | Huang et al. | |
| 2008/0119374 A1 * | 5/2008 | Willberg et al. | 507/209 |
| 2010/0252266 A1 * | 10/2010 | Huang et al. | 166/300 |

OTHER PUBLICATIONS

J. B. Crews, "Internal Phase Breaker Technology for Viscoelastic Surfactant Gelled Fluids," 2005 SPE International Symposium on Oilfield Chemistry, SPE 93449, Feb. 2-4, 2005, Houston, Texas, pp. 1-11.  
J. B. Crews, et al., "New Fluid Technology Improves Performance and Provides a Method to Treat High-Pressure and Deepwater Wells," 2006 SPE Annual Technical Conference and Exhibition, SPE 103118, Sep. 24-27, 2006, San Antonio, Texas, pp. 1-10.

* cited by examiner

*Primary Examiner* — John J Figueroa  
(74) *Attorney, Agent, or Firm* — Mossman, Kumar & Tyler PC

(57) ABSTRACT

Solid, particulate dicarboxylic acids may be fluid loss control agents and/or viscosifying agents for viscoelastic surfactant (VES) fluids in treatments such as well completion or stimulation in hydrocarbon recovery operations. The fluid loss control agents may include, but not be limited to, dodecanedioic acid, undecanedioic acid, decanedioic acid, azelaic acid, suberic acid, and mixtures thereof having a mesh size of from about 20 mesh to about 400 mesh (about 841 to about 38 microns). A mutual solvent or a blend of at least two alcohols subsequently added to the aqueous viscoelastic surfactant treating fluid will at least partially dissolve the solid, particulate dicarboxylic acid fluid loss control agents, and optionally also "break" or reduce the viscosity of the aqueous viscoelastic surfactant treating fluid.

13 Claims, 2 Drawing Sheets

MUTUAL SOLVENT-SOLUBLE AND/OR ALCOHOL BLENDS-SOLUBLE PARTICLES FOR VISCOELASTIC SURFACTANT FLUIDS

TECHNICAL FIELD

The present invention relates to aqueous, viscoelastic fluids used during hydrocarbon recovery operations, and more particularly relates, in one non-limiting embodiment, to methods and additives for increasing the viscosity of these fluids and/or for controlling the fluid losses thereof.

BACKGROUND

Hydraulic fracturing is a method of using sufficient pump rate and effective hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates which can cause the fluids to degrade and prematurely settle out the proppant before the fracturing operation is complete. Various fluids have been developed, but most commercially used fracturing fluids are aqueous based liquids which have either been gelled or foamed. When the fluids are gelled, typically a polymeric gelling agent, such as a solvatable polysaccharide is used, which may or may not be crosslinked. The thickened or gelled fluid helps keep the proppants within the fluid during the fracturing operation.

While polymers have been used in the past as gelling agents in fracturing fluids to carry or suspend solid particles in the brine, such polymers require separate breaker compositions to be injected to reduce the viscosity. Further, the polymers tend to leave a coating on the proppant even after the gelled fluid is broken, which coating may interfere with the functioning of the proppant. Studies have also shown that "fish-eyes" and/or "microgels" present in some polymer gelled carrier fluids will plug pore throats, leading to impaired leakoff and causing formation damage. Conventional polymers are also either cationic or anionic which present the disadvantage of likely damage to the producing formations.

Aqueous fluids gelled with viscoelastic surfactants (VESs) are also known in the art. VES-gelled fluids have been widely used as gravel-packing, frac-packing and fracturing fluids because they exhibit excellent rheological properties and are less damaging to producing formations than crosslinked polymer fluids. VES fluids are non-cake-building fluids, and thus leave no potentially damaging polymer cake residue. However, the same property that makes VES fluids less damaging tends to result in significantly higher fluid leakage into the reservoir matrix, which reduces the efficiency of the fluid especially during VES fracturing treatments. It would thus be very desirable and important to discover and use fluid loss agents for VES fracturing treatments in relatively high permeability formations. Further, there is a continuing need to improve or increase the viscosity of gelled fluids.

SUMMARY

There is provided, in one form, a method for treating a subterranean formation that involves injecting an aqueous viscoelastic surfactant treating fluid through a wellbore to the subterranean formation. The aqueous viscoelastic surfactant treating fluid includes an aqueous base fluid, a viscoelastic surfactant (VES) gelling agent and a solid, particulate dicarboxylic acid agent. The VES gelling agent is present in an amount effective to increase the viscosity of the aqueous viscoelastic surfactant treating fluid. The solid, particulate dicarboxylic acid agent is present in an amount effective to (a) improve the fluid loss of the aqueous viscoelastic treating fluid, and/or (b) further increase the viscosity of the aqueous viscoelastic surfactant treating fluid, as compared with an identical fluid absent the agent. The method further involves treating the subterranean formation, such as in a fracturing, frac-packing, acidizing, kill pill or other type of application. Treating the subterranean formation may be done concurrently with or after injecting an aqueous viscoelastic surfactant treating fluid. The method may also involve pumping a mutual solvent and/or a blend of alcohols solution to at least partially dissolve the dicarboxylic acid agent, and/or to decrease the viscosity of the aqueous viscoelastic surfactant treating fluid after a treatment with the aqueous viscoelastic surfactant treating fluid is completed.

There is further provided in another non-limiting embodiment an aqueous viscoelastic surfactant treating fluid that includes an aqueous base fluid, a viscoelastic surfactant (VES) gelling agent, and a solid, particulate dicarboxylic acid agent. The VES gelling agent is present in an amount effective to increase the viscosity of the aqueous viscoelastic surfactant treating fluid. The solid, particulate dicarboxylic acid agent is present in an amount effective to (a) improve the fluid loss of the aqueous viscoelastic treating fluid, and/or (b) further increase the viscosity of the aqueous viscoelastic surfactant treating fluid, as compared with an identical fluid absent the agent. Optionally a mutual solvent and/or a blend of alcohols solution is pumped to mix with the aqueous viscoelastic treating fluid to eventually at least partially dissolve the dicarboxylic acid agent, and/or to decrease the viscosity of the aqueous viscoelastic surfactant treating fluid after a treatment with the aqueous viscoelastic surfactant treating fluid is completed.

DETAILED DESCRIPTION

Figure 1:
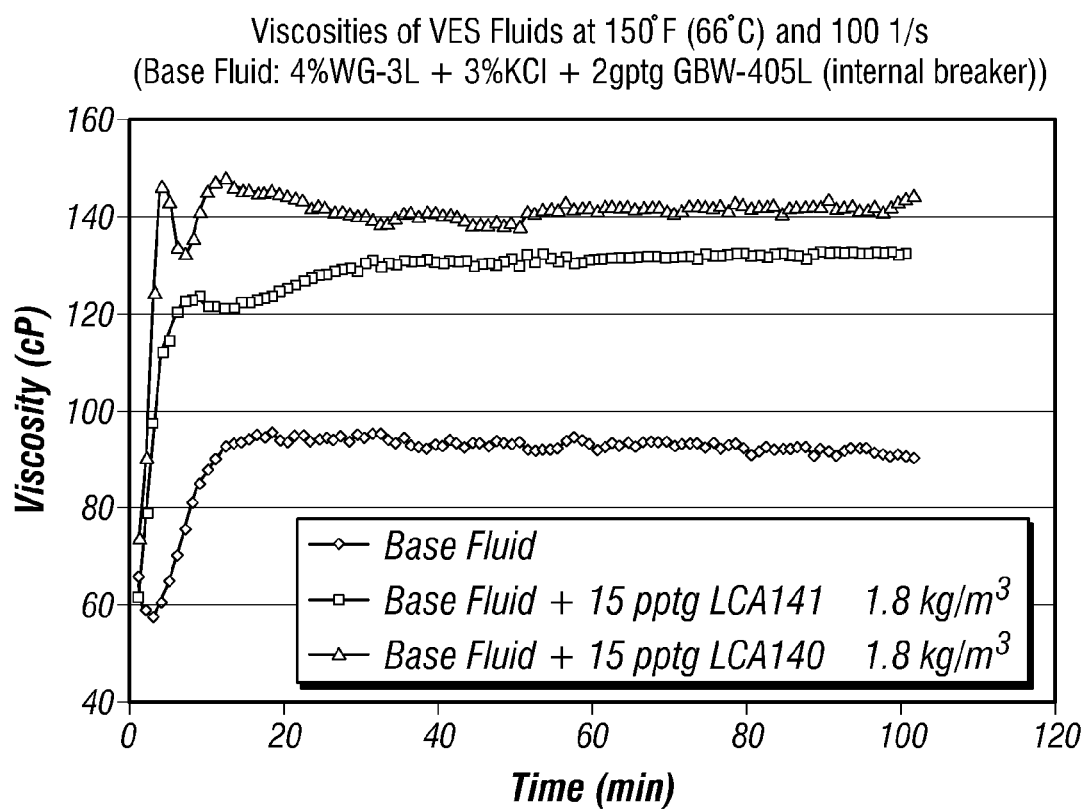
FIG. 1 is a graph of viscosity as a function of time for a base fluid having 4% WG-3L VES, 3% KCl, and 2 gallons per thousand gallons (gptg) GBW-405L (internal breaker) at 150° F. (66° C.) measured at 100 1/s, alone and then containing 15 pounds per thousand gallons (pptg) (1.8 kg/m$^3$) LCA141 (dodecanedioic acid) or LCA140 (a mixture of dodecanedioic acid, undecanedioic acid, sebacic (decanedioic) acid, azelaic acid, and suberic acid)

It has been discovered that small amounts of particle agents which are soluble in mutual solvents or alcohol blends will increase and improve fluid viscosity and/or reduce, lower or prevent fluid loss for aqueous fluids gelled with visco-elastic surfactants. Particularly suitable particles include, but are not necessarily limited to, solid, particulate dicarboxylic acids that are insoluble in both aqueous and hydrocarbon liquids, but which are soluble in mutual solvents or alcoholic blends. Particularly suitable dicarboxylic acids include, but are not necessarily limited to, dodecanedioic acid, undecanedioic acid, sebacic (decanedioic) acid, azelaic acid, suberic acid and mixtures thereof.

Since mutual solvents and/or alcohol blends are good external breakers for viscoelastic surfactant fluids, after pumping treatments for fracturing, frac-packing, acidizing and kill pills using VES-gelled fluids containing these mutual solvent- and/or alcohol blend-soluble solids, the mutual solvent and/or alcohol blends may be pumped downhole as a post-flush to quickly break the viscosity of the VES-gelled fluids and to dissolve the solid agents. The broken VES fluids with dissolved solids may be readily flowed back with the producing fluids and little or no damage to the formation has been generated. Lab viscosity and fluid leakoff tests show that the solvent-soluble particles may increase viscosity and reduce fluid loss for VES-gelled fluids.

As noted, suitable particulate agents are solid dicarboxylic acids, such as those described in U.S. Pat. No. 6,994,166, incorporated herein by reference in its entirety. Core flow tests reported in U.S. Pat. No. 6,994,166 demonstrated that the solids did not generate or produce formation damage after the solids were dissolved by the solvents.

These particulate agents include, in one non-limiting embodiment, dicarboxylic acids with formula molecular weights of from 146 to 400, inclusive, or a mixture of them. Alternatively, the dicarboxylic acids have formula molecular weights of from 160 independently up to 230.

These particulate agents are preferably compatible with acids conventionally used in acidizing treatments including, but not necessarily limited to hydrochloric acid, formic acid, acetic acid, long-chained (e.g. $C_5$-$C_8$) organic acids, and mixtures thereof with hydrofluoric acid, or aminocarboxylic acids and their derivatives. The particulate agents herein are also expected to be compatible with most acid additives, including but not necessarily limited to, iron control agents, non-emulsifiers, and corrosion inhibitors.

It is important that the solid dicarboxylic acids are insoluble in both aqueous and hydrocarbon liquids, but are highly soluble in regular mutual solvents or alcohol blends, which may be subsequently added into the fluid to dissolve the solid, particulate agents after use, and/or to reduce the viscosity ("break") the VES-gelled fluid. In the context herein, "insoluble" is defined as a solubility of less than 0.1 wt.% in the liquid of interest at room temperature of 70° F. (21° C.). Mutual solvents are defined herein as volatile solvents that are miscible with more than one class of liquids. In particular, mutual solvents may be understood as chemical additives for use in stimulation treatments that are soluble in oil, water and acid-based treatment fluids. They are routinely used in a range of applications, such as removing heavy hydrocarbon deposits, controlling the wettability of contact surfaces before, during and/or after a treatment, and preventing or breaking emulsions. Commonly used mutual solvents include, but are not necessarily limited to, glycol ethers such as ethylene glycol ethers which may include ethylene glycol monobutylether (EGMBE), ethylene glycol monoethyl ether, ethylene diglycol ether, diethylene glycol monobutyl ether, diethylene glycol monoethyl ether and the like; oxyalkylated alcohols, $C_2$-$C_4$ alcohols, such as 2-ethoxyethanol and the like, and mixtures thereof. Suitable alcohol blends include, but are not necessarily limited to, blends of the following alcohols: isopropanol and EGMBE and the like.

In one non-limiting embodiment herein, the particulate agents should be easily granulated or ground into different particle size distributions, for instance, a particle size from about 20 mesh to about 400 mesh (about 841 to about 38 microns), in another non-restrictive version from about 40 mesh, independently up to about 120 mesh (about 425 to about 125 microns). The dicarboxylic acid agents herein should have low toxicity and their melting points may range from about 180 to about 300° F. (about 82 to about 149° C.), in another non-limiting embodiment from about 200, independently up to about 250° F. (about 93 to about 121° C.). These particulate agents should have relatively low specific gravities, i.e. from about 1.00 to about 1.25, which makes them easy to suspend with regular acid fluids and low pumping rates.

As noted, examples of particular solid dicarboxylic acids falling within the definitions herein include, but are not necessarily limited to, dodecanedioic acid, undecanedioic acid, decanedioic acid (sebacic acid), azelaic acid, suberic acid, and mixtures thereof. The dicarboxylic acid agents are more readily available than the condensation products of U.S. Pat. No. 4,715,967. These products are low molecular weight condensation products of hydroxyacetic acid with itself or compounds containing other hydroxyl-, carboxylic acid-, or hydroxycarboxylic-acid moieties.

The carrier fluids useful to carry or suspend the particulate agents herein are any of VES-gelled aqueous fluids, including those described in detail below, as well as those known in the art. These may be generally described as mixtures together with proppants, gravel, acids, any assortment of corrosion inhibitors, surface tension reducing agents, non-emulsifiers and brines and which would include any of the commonly used acids (e.g. HCl, HF, formic, acetic and long-chained organic acids, and the like).

It is difficult to specify in advance the proportion of dicarboxylic acid generally useful in the VES-gelled fluid due to a number of complex, interrelated factors including, but not necessarily limited to, the particular VES employed and its proportions, particular acids used, the nature and permeability of the interval being treated, the temperature and pressure conditions of the formation, the particular particulate agent and carrier fluid used, the pumping rates employed, and the like. Nevertheless, in an effort to give some indication of appropriate proportions that may be used, in one non-limiting embodiment, the proportion of the particulate agent in the carrier fluid may range from about 2 to about 50 pptg (about 0.2 to about 6 kg/m$^3$), and in an alternate embodiment from about 5, independently up to about 30 pptg (about 0.6, independently up to about 3.6 kg/m$^3$).

In one non-limiting embodiment, the particulate agents herein may be pumped with the VES-gelled fluid into the target zone to temporarily plug higher permeability areas and improve or increase the viscosity of the VES-gelled fluid beyond that achievable with just the VES alone. After the treatment, the particulate agents may be dissolved by the mutual solvents (or alcohol blend) solution and/or melted at high temperatures. It will be appreciated that the method herein is considered successful if some fluid loss improvement is achieved over and above that attained with an otherwise identical fluid, absent the particulate additive. That is, it is not necessary for the interval to be completely impenetrable by the fluid for the method to be effective, although complete fluid loss prevention would, of course, be desirable. Similarly, it is not necessary to achieve any particular or certain increase in fluid viscosity over and above that achievable with the VES alone, as long as some increase is generated when it is desired.

The discovery described herein allows the VES system to have improved fluid loss to help minimize formation damage during well completion or stimulation operations. That is, the introduction of these additives to the VES-gelled aqueous system will limit and reduce the amount of VES fluid which leaks-off into the pores of a reservoir during a fracturing or frac-packing treatment, thus minimizing the formation damage that may occur by the VES fluid within the reservoir pores. Also, limiting the amount of VES fluid that leaks-off into the reservoir during a treatment will allow more fluid to remain within the fracture or other downhole spaces and thus less total fluid volume will be required for the treatment. Having less fluid leaking-off and more fluid remaining within the fracture will enable greater fracture size and geometry to be generated. Thus, the use of these additives in a VES-gelled aqueous system will improve the performance of the VES fluid while lowering fracturing treatment cost.

In the methods described herein, an aqueous fracturing fluid, as a non-limiting example, is first prepared by blending a VES into an aqueous fluid. The aqueous base fluid could be, for example, water, brine, aqueous-based foams or water-alcohol mixtures. The brine base fluid may be any brine, conventional or to be developed which serves as a suitable media for the various concentrate components. As a matter of convenience, in many cases the brine base fluid may be the brine available at the site used in the completion fluid, for a non-limiting example.

The aqueous fluids gelled by the VESs herein may optionally be brines. In one non-limiting embodiment, the brines may be prepared using salts including, but not necessarily limited to, NaCl, KCl, CaCl$_2$, MgCl$_2$, NH$_4$Cl, CaBr$_2$, NaBr, sodium formate, potassium formate, and other commonly used stimulation and completion brine salts. The concentration of the salts to prepare the brines can be from about 0.5% by weight of water up to near saturation for a given salt in fresh water, such as 10%, 20%, 30% and higher percent salt by weight of water. The brine can be a combination of one or more of the mentioned salts, such as a brine prepared using NaCl and CaCl$_2$, or NaCl, CaCl$_2$, and CaBr$_2$ as non-limiting examples.

The viscoelastic surfactants suitable for use herein may include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents RN$^+$(R')$_2$O$^-$ may have the following structure (I):

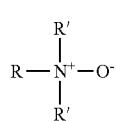

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amine oxide gelling agent is tallow amido propylamine oxide (TAPAO), which should be understood as a dipropylamine oxide since both R' groups are propyl.

Materials sold under U.S. Pat. No. 5,964,295 include CLEARFRAC™, which may also comprise greater than 10% of a glycol. This patent is incorporated herein in its entirety by reference. One preferred VES is an amine oxide. As noted, a particularly preferred amine oxide is tallow amido propylamine oxide (TAPAO), sold by Baker Oil Tools as SURFRAQ™ VES. SURFRAQ is a VES liquid product that is 50% TAPAO and 50% propylene glycol. These viscoelastic surfactants are capable of gelling aqueous solutions to form a gelled base fluid. The additives herein may also be used in DIAMOND FRAQ™ which is a VES system, similar to SURFRAQ, which contains VES breakers, sold by Baker Oil Tools.

The amount of VES included in the fracturing fluid depends on two factors. One involves generating, creating or producing enough viscosity to control the rate of fluid leak off into the pores of the fracture, together with the particulate agents described herein, which is also dependent on the type and amount of these fluid loss control agents used, and the second involves creating, generating or producing a viscosity high enough to develop the size and geometry of the fracture within the reservoir for enhanced reservoir production of hydrocarbons and to also keep the proppant particles suspended therein during the fluid injecting step, in the non-limiting case of a fracturing fluid. Keeping the particulate agents, such as the solid dicarboxylic acids, suspended is also a goal of the VES-gelled treatment fluid, but these agents in fact aid in their own suspension. Thus, depending on the application, the VES is added to the aqueous fluid in concentrations ranging from about 0.5 to 12.0% by volume of the total aqueous fluid (5 to 120 gallons per thousand gallons (gptg)). In another non-limiting embodiment, the range is from about 1.0, independently up to about 6.0% by volume VES product. In an alternate, non-restrictive form, the amount of VES ranges from 2, independently up to about 10 volume %.

In hydraulic fracturing applications, propping agents are typically added to the base fluid after the addition of the VES. Propping agents and/or gravel include, but are not limited to, for instance, quartz sand grains, glass and ceramic beads, bauxite grains, sintered bauxite, sized calcium carbonate, other sized salts, walnut shell fragments, aluminum pellets, nylon pellets, and the like. The propping agents are normally used in concentrations between about 1 to 14 pounds per gallon (120-1700 kg/m$^3$) of fracturing fluid composition, but higher or lower concentrations can be used as the fracture design requires. The base fluid can also contain other conventional additives common to the well service industry such as water wetting surfactants, non-emulsifiers and the like. In the methods and compositions herein, the base fluid can also contain additives which can contribute to breaking the gel (reducing the viscosity) of the VES fluid.

While the viscoelastic fluids are described most typically herein as having use in fracturing fluids, it is expected that they will find utility in completion fluids, gravel pack fluids, frac-packing fluids, acidizing fluids, fluid loss pills, lost circulation pills, kill pills, diverter fluids, foamed fluids, stimulation fluids (which may contain a stimulating agent such as an acid or a solvent), and the like.

In another non-limiting embodiment, the treatment fluid may contain other viscosifying agents, including crosslinked and non-crosslinked polymers, other different surfactants, clay stabilization additives, scale dissolvers, biopolymer degradation additives, and other common and/or optional components.

In a useful, non-restrictive embodiment herein, use with internal VES breakers can have synergistic clean-up effects for the fluid loss control agent and the VES fluid. Use of these compositions with an internal breaker may allow less VES fluid to leak-off into the reservoir, thus resulting in less fluid needed to be broken and removed once the treatment is over.

The invention will be further described with respect to the following Examples which are not meant to limit the invention, but rather to further illustrate the various embodiments.

EXAMPLES

Lab viscosity and fluid leakoff tests show that the solvent-soluble particles herein may increase viscosity and reduce fluid loss for VES-gelled aqueous fluids. Previous core flow tests in U.S. Pat. No. 6,994,166 show that the solids did not generate damage after the solids were dissolved by the solvents.

Two different dicarboxylic particles were used in the Examples herein. LCA140 is a mixture of dodecanedioic acid, undecanedioic acid, sebacic (decanedioic) acid, azelaic acid, and suberic acid (Agent A in U.S. Pat. No. 6,994,166), which is CORFREE M1 product from INVISTA Intermediates. LCA141 is dodecanedioic acid (DDDA) (Agent B in U.S. Pat. No. 6,994,166), also from INVISTA. The particle size for both LCA140 and LCA141 is from 120 mesh to 60 mesh (125 microns to 250 microns). The properties of the LCA140 particles and the LCA141 particles are given in Table I; whereas their solubilities are given in Table II.

TABLE I

PROPERTIES OF DICARBOXYLIC ACID AGENTS

| | LCA140 | LCA141 |
|---|---|---|
| Form | Flaked solid | Flaked solid |
| Melting point | 85-95° C. (185~203° F.) | 130° C. (266° F.) |
| Odor | Odorless | Odorless |
| Color | Color varies | White |
| Specific gravity | 1.02 | 1.15 |
| Water solubility | Very low (70° F. (21° C.)) | Very low (70° F. (21° C.))<br>0.012% (140° F. (60° C.))<br>0.01% (176° F. (80° C.))<br>0.04% (212° F. (100° C.)) |

TABLE II

SOLUBILITY OF DICARBOXYLIC ACID AGENTS IN VARIOUS SOLVENTS

| | Solubility, % | |
|---|---|---|
| Solvent | LCA140 | LCA141 |
| Isopropanol | >20.47 (70° F. (21° C.)) | >9.73 (183° F. (84° C.)) |
| Ethylene glycol monobutyl ether (EGMBE) | 13.46 (70° F. (21° C.)) | 5.89 (183° F. (84° C.)) |

TABLE II-continued

SOLUBILITY OF DICARBOXYLIC ACID AGENTS IN VARIOUS SOLVENTS

| | Solubility, % | |
|---|---|---|
| Solvent | LCA140 | LCA141 |
| Blend C (50:50 v/v isopropanol and oxyalkylated alcohol mixture) | 16.57 (70° F. (21° C.)) | 6.99 (183° F. (84° C.)) |

Shown in FIG. 1 is a graph of viscosity as a function of time for a base fluid having 4% WG-3L VES, 3% KCl, and 2 gptg GBW-405L (internal breaker) at 150° F. (66° C.) measured at 100 1/s. The results of the base fluid alone and then containing 15 pptg (1.8 kg/m$^3$) LCA141 and LCA140 in two separate inventive fluids were plotted. It may be seen that LCA141 increases viscosity noticeably over the base fluid containing no solid, particulate dicarboxylic acid agent, and that LCA140 increases the viscosity even further.

Figure 2:
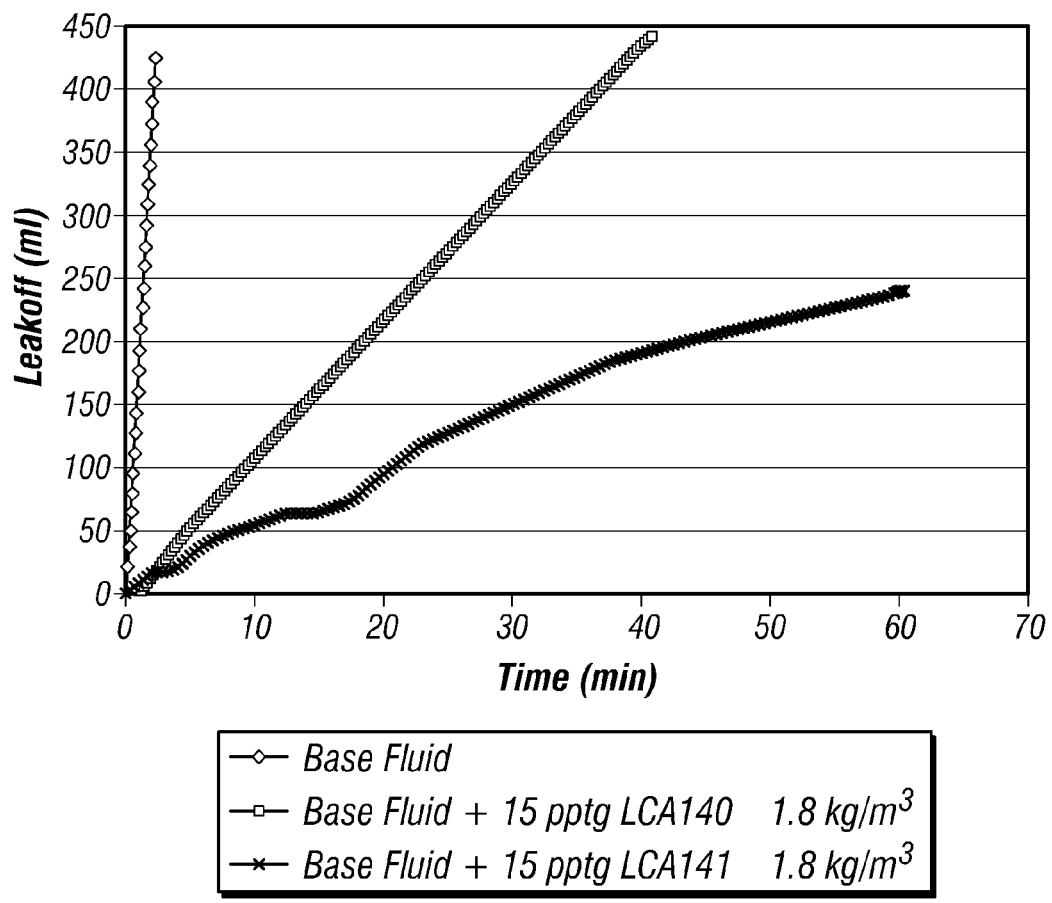
FIG. 2 is a graph of leakoff as a function of time for tests with the three fluids of FIG. 1 at 300 psi (2.1 MPa).

FIG. 2 is a graph of leakoff as a function of time for tests with the three fluids of FIG. 1 at 300 psi (2.1 MPa). It may be readily seen that the base fluid with no solid, particulate dicarboxylic acid agent leaks off almost immediately, whereas leakoff is greatly inhibited with LCA140, and is even further limited with LCA141. It has thus been demonstrated that the solid, particulate dicarboxylic acid agents are suitable to both improve the fluid loss of aqueous viscoelastic treating fluids, as well as to increase their viscosities.

In the foregoing specification, the invention has been described with reference to specific embodiments thereof, and has been demonstrated as effective in inhibiting fluid loss for viscoelastic surfactant gelled fluids, as well as to increase their viscosities. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines, viscoelastic surfactants, dicarboxylic acids, mutual solvents, alcohol blends and other components falling within the claimed parameters, but not specifically identified or tried in a particular composition, are anticipated to be within the scope of this invention.

The present invention may suitably comprise, consist or consist essentially of the elements disclosed and may be practiced in the absence of an element not disclosed.

The words "comprising" and "comprises" as used throughout the claims is to interpreted "including but not limited to".

What is claimed is:

1. A method for treating a subterranean formation comprising:
   injecting an aqueous viscoelastic surfactant treating fluid through a wellbore to the subterranean formation, where the aqueous viscoelastic surfactant treating fluid comprises:
     an aqueous base fluid;
     a viscoelastic surfactant (VES) gelling agent in an amount effective to increase the viscosity of the aqueous viscoelastic surfactant treating fluid; and
     an amount of a solid, particulate dicarboxylic acid agent sufficient to have an effect selected from the group consisting of:

improving the fluid loss of the aqueous viscoelastic treating fluid, and further increasing the viscosity of the aqueous viscoelastic surfactant treating fluid, as compared with an identical fluid absent the agent, where the solid, particulate dicarboxylic acid agent is insoluble in aqueous liquids and hydrocarbon liquids, but is soluble in mutual solvents and/or blends of at least two alcohols, and where the solid, particulate dicarboxylic acid agent has a formula molecular weight of from 146 to 400, where the aqueous base fluid, the VES gelling agent and the solid, particulate dicarboxylic acid agent were added together to form the aqueous viscoelastic surfactant treating fluid prior to injecting; and treating the subterranean formation wherein the treating the subterranean formation is done concurrently with or after the injecting an aqueous viscoelastic surfactant treating fluid.

2. The method of claim 1 where the solid, particulate dicarboxylic acid agent has a melting point from about 180 to about 300° F. (about 82 to about 149° C.).

3. The method of claim 1 where the solid, particulate dicarboxylic acid agent has a mesh size of from about 20 mesh to about 400 mesh (about 841 to about 38 microns).

4. The method of claim 1 where the proportion of solid, particulate dicarboxylic acid agent in the aqueous viscoelastic surfactant treating fluid ranges from about 2 to about 50 pounds per thousand gallons (pptg) (about 0.2 to about 6 kg/m$^3$).

5. The method of claim 1 where the solid, particulate dicarboxylic acid agent is selected from the group consisting of dodecanedioic acid, undecanedioic acid, decanedioic acid, azelaic acid, suberic acid, and mixtures thereof.

6. The method of claim 1 further comprising, after the treating, adding to the aqueous viscoelastic surfactant treating fluid a solvent selected from the group consisting of mutual solvents, a blend of at least two alcohols, and mixtures thereof, where the amount of solvent added is effective to dissolve at least a portion of the solid, particulate dicarboxylic acid agent.

7. The method of claim 6 where the amount of solvent is effective to reduce the viscosity of the aqueous viscoelastic surfactant treating fluid.

8. The method of claim 1 where treating the subterranean formation is selected from the group consisting of:

fracturing the formation under effective pressure where the aqueous viscoelastic treating fluid further comprises a proppant;

packing the formation with gravel where the aqueous viscoelastic treating fluid further comprises gravel;

stimulating the formation where the aqueous viscoelastic treating fluid further comprises a stimulating agent;

completing a well;

controlling fluid loss where the aqueous viscoelastic treating fluid further comprises a salt or easily removed solid; and mixtures thereof; and killing the well.

9. A method for treating a subterranean formation comprising:

injecting an aqueous viscoelastic surfactant treating fluid through a wellbore to the subterranean formation, where the aqueous viscoelastic surfactant treating fluid comprises:

an aqueous base fluid;

a viscoelastic surfactant (VES) gelling agent in an amount effective to increase the viscosity of the aqueous viscoelastic surfactant treating fluid; and from about 2 to about 50 pounds per thousand gallons (pptg) (about 0.2 to about 6 kg/m$^3$), based on the aqueous viscoelastic surfactant treating fluid, of a solid, particulate dicarboxylic acid agent, where the solid, particulate dicarboxylic acid agent is insoluble in aqueous liquids and hydrocarbon liquids, but is soluble in mutual solvents and/or blends of at least two alcohols, where the solid, particulate dicarboxylic acid agent is selected from the group consisting of dodecanedioic acid, undecanedioic acid, decanedioic acid, azelaic acid, suberic acid, and mixtures thereof, where the aqueous base fluid, the VES gelling agent and the solid, particulate dicarboxylic acid agent were added together to form the aqueous viscoelastic surfactant treating fluid prior to injecting; and treating the subterranean formation wherein the treating the subterranean formation is done concurrently with or after the injecting an aqueous viscoelastic surfactant treating fluid.

10. The method of claim 9 where the solid, particulate dicarboxylic acid agent has a melting point from about 180 to about 300° F. (about 82 to about 149° C.).

11. The method of claim 9 where the solid, particulate dicarboxylic acid agent has a formula molecular weight of from 146 to 400.

12. The method of claim 9 where the solid, particulate dicarboxylic acid agent has a mesh size of from about 20 mesh to about 400 mesh (about 841 to about 38 microns).

13. The method of claim 9 further comprising, after the treating, adding to the aqueous viscoelastic surfactant treating fluid a solvent selected from the group consisting of mutual solvents, a blend of at least two alcohols, and mixtures thereof, where the amount of solvent added is effective to dissolve at least a portion of the solid, particulate dicarboxylic acid agent.

* * * * *